United States Patent [19]

Takada

[11] 4,363,501
[45] Dec. 14, 1982

[54] PASSIVE TYPE VEHICLE OCCUPANT RESTRAINT BELT SYSTEM

[76] Inventor: Juichiro Takada, 3-12-1, Shinmachi, Setagayaku, Tokyo, Japan

[21] Appl. No.: 230,267

[22] Filed: Jan. 30, 1981

[51] Int. Cl.³ .............................................. B60R 21/10
[52] U.S. Cl. .................................... 280/804; 280/807; 297/469
[58] Field of Search ............... 280/802, 803, 804, 807; 297/469, 473

[56] References Cited

U.S. PATENT DOCUMENTS 4,222,587  9/1980  Goi ........................................ 280/804
4,286,804  9/1981  Maekawa ............................. 280/804
4,299,408 11/1981  Takada ................................ 280/804

FOREIGN PATENT DOCUMENTS 106837  8/1980  Japan .................................... 280/804

Primary Examiner—Joseph F. Peters, Jr.
Assistant Examiner—John A. Carroll
Attorney, Agent, or Firm—Brumbaugh, Graves, Donohue & Raymond

[57] ABSTRACT

Drive device for a movable belt transfer guide in a passive seat belt system includes a friction coupling that is housed separately from the gears to isolate it from the gear lubricant. The coupling normally transmits the driving force, but slips if the transfer guide tends to be overdriven thereby minimizing overloading and shock loads.

8 Claims, 11 Drawing Figures

PASSIVE TYPE VEHICLE OCCUPANT RESTRAINT BELT SYSTEM

FIELD OF THE INVENTION

The present invention relates to a passive type vehicle occupant restraint belt system, that is, the type of occupant restraint belt system in which a lap belt, shoulder belt or both are automatically transferred between restraint and release configurations in response to opening and closing of the vehicle door.

BACKGROUND OF THE INVENTION

It is widely recognized by vehicle safety authorities that the manually operated restraint belt systems with which most motor vehicles are equipped at the present time are often not used by the vehicle occupants. Many people find it unduly troublesome to do up the belt each time they enter the vehicle and undo it when they leave. They also find the belt somewhat uncomfortable when in restraining position. By the same token, it is also recognized that the safety belts can markedly reduce injuries and fatalities resulting from vehicle accidents.

In order to encourage the use of a safety belt system, a great deal of development effort has gone into the creation of passive type belt systems that are automatically shifted into a restraining configuration when an occupant enters a vehicle and closes the door and automatically transferred to a releasing configuration when the occupant opens the door. Many of these proposed passive systems employ one or more belt guide members that are connected to the restraint belt and are driven back and forth along a guide rail to transfer the engaged portion of the belt between a restraint location and a release location establishing the respective restraint and release configurations of the belt. For example, some types of systems involve a shoulder belt that is connected to a moving anchor that moves along a track located at the edge of the vehicle roof generally above the door. The moving anchor moves between a restraint location above and behind the outboard shoulder of the occupant and a release location at or along the front pillar. In a similar system, the outboard end of a shoulder belt is anchored above and behind the vehicle occupant and passes from the anchor through a movable guide member that moves along a track above the door. Other systems employ a moving anchor or a belt guide member that moves along a guide rail installed on the vehicle door, and there are some systems in which an inboard portion of a lap belt, shoulder belt or control belt is moved forward and backward.

The drive mechanism for transferring the moving anchor or movable belt guide, which are hereinafter referred to collectively as a belt guide member, often is a reversible, electric motor powered by the vehicle battery and coupled to the belt guide member by a semi-flexible drive element, such as a racked wire, by means of a reduction device. The drive system for the belt guide member should fulfill a number of requirements, and not all drive systems proposed heretofore have met the requirements to the extent necessary to ensure commercial success. Among the requirements is that the device be of compact construction so that it can readily be installed in a small amount of space, such as the space within the vehicle door or within the body of the vehicle adjacent to the door frame. It is also essential that the drive device include a reliable control system to ensure that the belt system remains secured in the restraint location when the occupant is in the vehicle and the door is closed. Any mismatching of the timing or any failure of the device properly to locate the belt guide member at the restraint location can present a great risk to the occupant in the event of an accident. The drive system must also be long-lived and capable of operating reliably through thousands of cycles of operation throughout the useful life of the vehicle. This means that proper lubrication should be provided to minimize wear, and yet the lubrication must not interfere with energy-absorbing devices, electrical systems and the like. Meeting the requirements of reliability and long-life necessitates minimizing shock loads on the components as the drive mechanism is started and stopped, lest repeated shock loads cause wear or breakage to one or more components of the system. This requirement ties in with the requirement for proper timing of the control of the drive system while ensuring that the restraint and release locations of the movable belt guide member are uniformly attained. The foregoing requirements are difficult to achieve in a manner which minimizes manufacturing costs of the system as well as the complexity and expense of assembling the system in the vehicle.

SUMMARY OF THE INVENTION

There is provided, in accordance with the present invention, a belt guide member transfer system which meets very well all of the requirements described above, namely reliability over a long useful life, small size, provision for minimizing shock loads, increasing the tolerance of control devices and relatively low manufacturing and installation costs. It will be apparent to those skilled in the art that the drive system can be applied to move a movable belt guide associated with any of a variety of types of passive belt systems. In other words, it can be used with a moving anchor or transfer ring associated with a track at the edge of the roof above the vehicle door, a track installed on the door or a track at an inboard location in the vehicle. This system may involve a shoulder belt and a knee bolster, or a shoulder belt and a lap belt, such as the three point type of system.

In accordance with one aspect of the present invention, a reversible electric motor drives the semi-flexible transfer wire by way of a reduction device. The reduction device comprises a housing having first and second closed compartments separated by a common dividing partition. An output shaft is journaled in the partition and includes portions located in each of the two compartments. An output drive element is affixed to the portion of the output shaft in the first compartment of the housing and is coupled to the semi-flexible transfer element. An input shaft, which has its axis disposed orthogonically to the axis of the output shaft, extends into the second compartment and carries a worm gear. A worm wheel is rotatably carried by the portion of the output shaft in the second compartment and meshes with the worm gear. The worm wheel is, in turn, coupled to the output shaft through a friction coupling that is fully enclosed and is received in the second compartment. Ordinarily, the friction coupling transmits the drive from the worm wheel to the output shaft and provides a friction force that is sufficiently high to ensure normal operation of the transfer system and full transfer of the movable belt guide element between the restraint and release locations. On the other hand the friction coupling will slip if the system is overdriven and the belt guide transfer element comes into engagement with a stop at the restraint or the release location. Accordingly, damaging overloads and shock loads are eliminated through the use of the friction coupling. Another advantage of the reduction device is the compartmentalization of the casing and the full enclosure of the friction coupling so that the input and output gears can be lubricated with a pre-packed grease while keeping lubricant away from the friction coupling.

An advantageous arrangement of the reduction device includes a worm wheel that is cup-shaped and includes a hub portion supported on the output shaft and a periphiral flange on the hub having external teeth defining a cavity radially inward of the flange. The friction coupling is received within the cavity, and a cap joined to the free edge of the flange closes the cavity. In the foregoing arrangement, the friction coupling may include an input disc coupled to the worm wheel for rotation, an output disc coupled to the output shaft to drive it, and a friction disc interposed between the input and output discs and loaded by a spring to maintain the friction disc and the input and output discs in frictional engagement with each other.

In accordance with a further aspect of the present invention, there is an improved control system which comprises a first electrical circuit that is adapted to connect the motor to a power source for rotation in one direction to drive the guide member to the restraint location. The first circuit includes a seat switch which is closed in response to a weight on the seat (normally the presence of a passenger on the seat), a restraint location detector switch adapted to be closed when the guide member is not at the restraint location, and a control switch adapted to be closed in response to closing of the vehicle door. The first electrical circuit, therefore, energizes the motor to drive it in the said one direction (i.e. drive the belt guide from the release location to the restraint location) only when the seat is occupied, the belt guide member is not at the restraint location and the door is closed.

The control system further includes a second electrical circuit which is adapted to connect the motor to the power source for rotation in the other direction, i.e. to drive the guide member from the restraint location to the release location. The second circuit includes a release location detection switch which is closed when the belt guide member is away from the restraint location and a control switch which is closed in response to opening of the vehicle door. The second circuit, therefore, energizes the motor for rotation in a direction to transfer the belt guide member from the restraint location to the release location only when the belt guide is not at the release location and the vehicle door is opened.

It is of significant advantage, according to a preferred embodiment of the control system, for the first circuit to include detection switches that are transferred in response to the rotational position of a switching member that is coupled to the output shaft of the reduction device by a reduction gear for rotation of less than 360° during rotation of the output shaft corresponding to full movement of the belt transfer guide member between the release and restraint locations.

In one form of the preferred embodiment, each detector switch includes a pair of fixed contacts, and the switching member includes a rotary conductive contact that electrically connects the fixed contacts selectively, depending upon the rotational position of the switching member. Alternatively, the detector switches may be microswitches, and the switching member a rotary cam having cam surfaces that transfer the detector switches selectively.

In the preferred embodiments of the control system, namely embodiments in which the detector switches are directly associated with the reduction device output, the drive system is largely self-contained and need only be wired to the seat switch and a double pole, double throw control switch, thereby eliminating the wiring and brackets and associated installation complications involved with limits switches at the ends of the guide rail. On the other hand, it is perfectly possible for limit switches associated with the guide rail to be used in lieu of switches associated with the reduction device.

For better understanding of the invention, reference may be made to the following description of exemplary embodiments, taken in conjunction wih the figures of the accompanying drawings.

DESCRIPTION OF EXEMPLARY EMBODIMENTS

Figure 1:
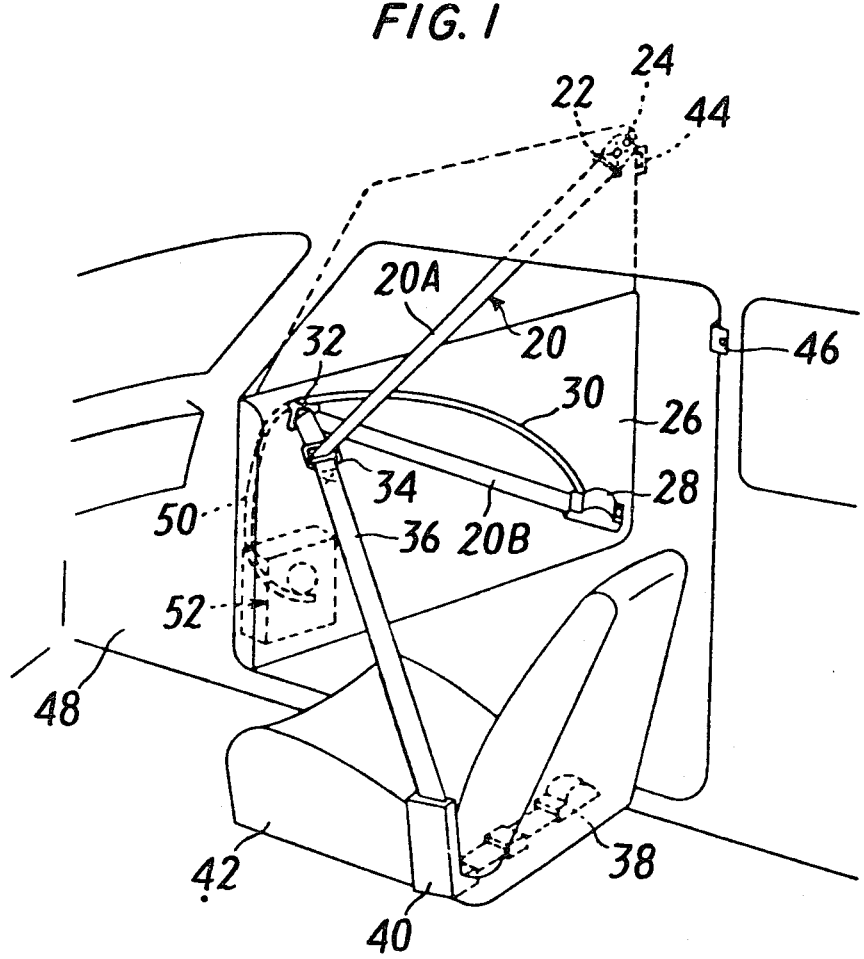
FIG. 1 is a generally schematic pictorial view of an exemplary restraint system in which the present invention is useful.

As mentioned above, a drive device embodying the present invention may be used to transfer a movable belt guide element between restraint and release locations in a variety of specific passive belt systems. The passive system shown in FIG. 1 is merely exemplary of the various systems with which the drive device embodying the present invention may be used. The restraint belt system shown in FIG. 1 comprises a continuous restraint belt 20 having one end attached by means of an emergency release buckle 22 to an anchor 24 affixed to the upper rear corner of the vehicle door 26. The other end of the restraint belt 20 leads from an emergency locking retractor 28 affixed adjacent the lower rear corner of the door. A guide rail 30 is installed on the door. The belt 20 passes through a movable guide member 32 that slides along the guide rail 30 and then passes from the member 32 through a D-ring 34 that is affixed to the free end of a control belt 36. The control belt 36 leads from an emergency locking retractor 38 affixed under the vehicle seat and passes through a combination force-responsive belt anchor and guide device 40 affixed adjacent the inboard lower rear portion of the seat 42. When the vehicle door is closed, a slotted tab 44 on the anchor 24 mates with a reinforcing bracket 46 that is strongly fastened to the center pillar of the vehicle body 48.

The belt guide member 32 is moved fore and aft along the guide rail 30 by a drive system that comprises a racked wire 50 and a drive device 52 installed in the vehicle door. The D-ring 34 subdivides the continuous belt loop 20 into a shoulder belt portion 20A and a lap belt 20B. When the vehicle door is opened, the drive system moves the belt guide member 32 to a release location at the upper forward end of the guide rail 30, and in the process shifts the restraint belt 20 into a release configuration in which it lies generally close to the inner surface of the door. Meanwhile the control belt 36 is withdrawn from the retractor. When the vehicle door is closed, the transfer device moves the movable belt guide member 32 to a restraint location at the lower rear end of the guide rail 30 generally adjacent the retractor 28, thereby allowing the continuous belt 20 automatically to assume a restraint configuration in which the control belt 36 is pulled in by the retractor 38 such that the D-ring 34 lies adjacent the guide 40 at the inboard lower rear portion of the seat 42. In the restraining configuration, therefore, the shoulder belt portion 20A extends inwardly and downwardly across the vehicle occupant's torso, and the lap belt portion 20B extends inwardly across the occupant's lap. The retractor 38 provides a greater force on the control belt than the force exerted on the restraint belt by the retractor 28, thus insuring that the belt is in the restraining configuration, but also providing by way of the retractor 28 adjustment in the length in the restraint belt 20 to fit vehicle occupants of various sizes and shapes.

Figure 2:
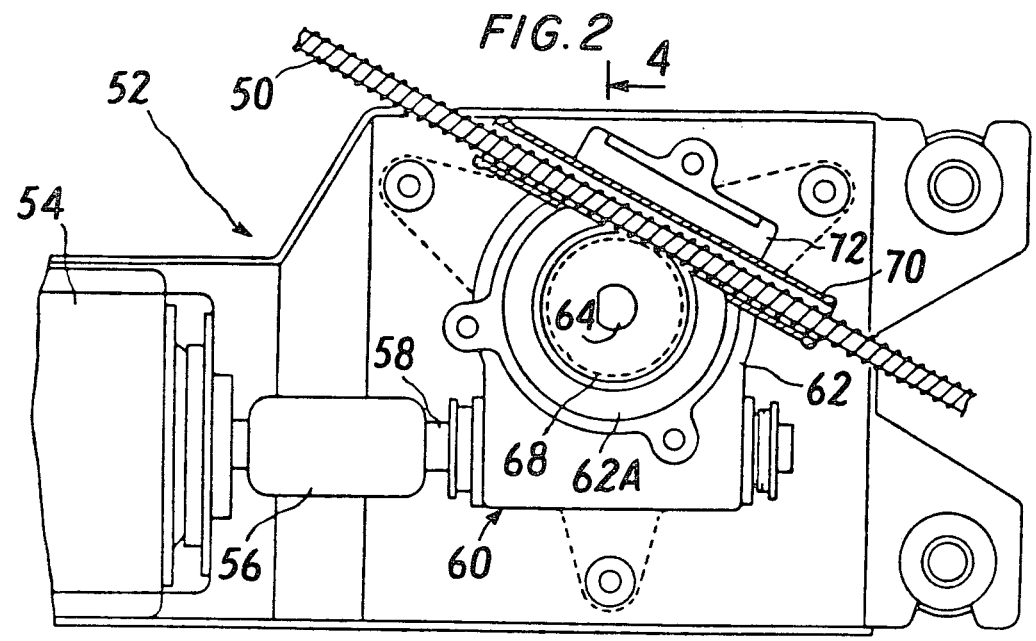
FIG. 2 is a side elevational view of one embodiment of drive device.
Figure 3:
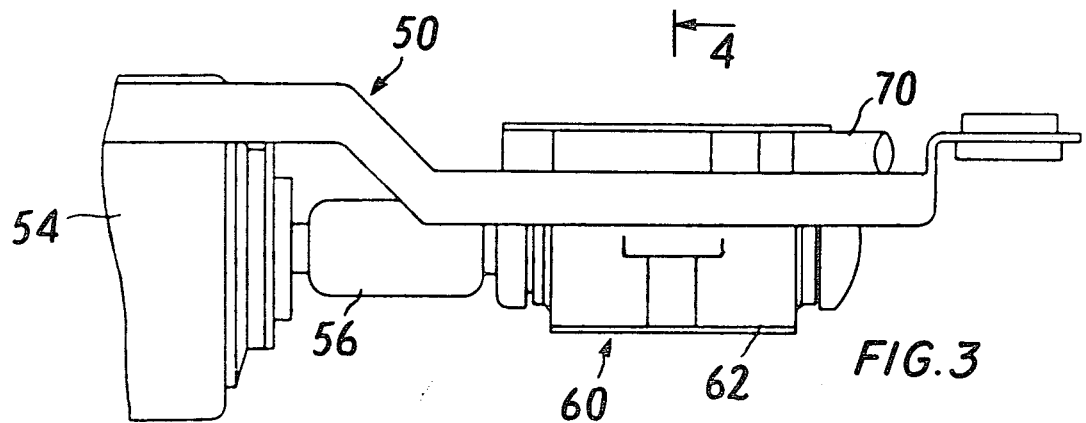
FIG. 3 is a plan view of the drive device shown in FIG. 2.
Figure 4:
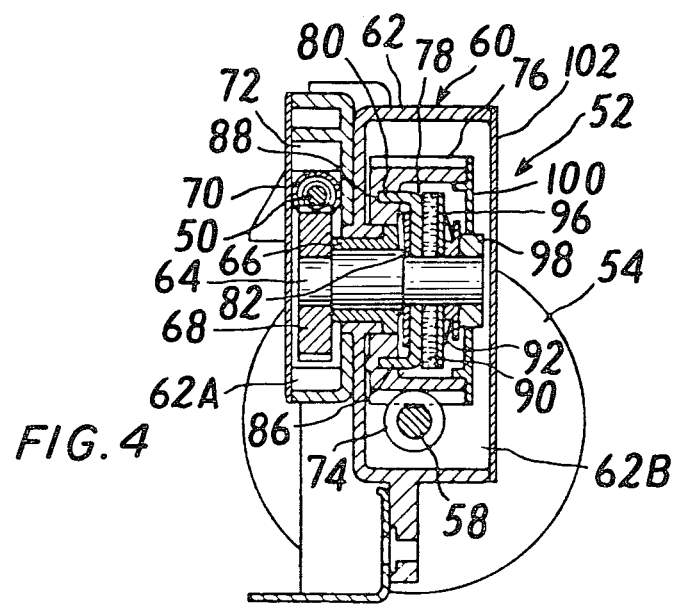
FIG. 4 is an end cross-sectional view of the embodiment shown in FIGS. 2 and 3 taken generally along the lines 4—4 of FIG. 2 and in the direction of the arrows.

The drive device shown in FIGS. 2-4 comprises a reversible electric motor 54 coupled by a rubber coupling 56 to the input shaft 58 of a reduction device 60. The reduction device 60 includes a housing 62 that is made up of two generally cup-shaped members positioned back to back to define a first compartment 62A and a second compartment 62B separated by a common partition. The output shaft 64 of the reduction device 60 is journalled by means of a combination bearing and seal 66 in the partition wall of the casing. The output gear 68 is fastened to a portion of a shaft 64 that extends into the first compartment 62A. The racked wire 50 is located by a guide tube 70 in meshing engagement with the output gear 68. A space 72 is left between the racked wire casing 70 and the housing to facilitate assembly and adjustment of the racked wire to proper meshing position.

The input shaft 58 of the reduction device 60 lies orthogonically to the output shaft 64 and extends into the second compartment 62B. A worm gear 74 affixed to the input shaft 58 meshes with the external teeth on a worm wheel 76. The worm wheel is generally cup-shaped and includes a hub portion that is loosely received on the output shaft 64 or, more precisely, on the bushing 66 of the output shaft, and a cylindrical portion that extends rearwardly from the periphery of the hub portion. A friction coupling 78 received within the cavity defined by the cylindrical portion of the worm wheel 76 couples the worm wheel to the output shaft 64. The friction coupling 78 comprises an input disc 80 that is loosely received on the output shaft 64, is located rearwardly of a spacer washer 82 and has a multiplicity of forwardly bent tabs 86 that fit into corresponding holes 88 in the worm wheel hub so that the input disc 80 rotates with the worm wheel at all times. The rearward face of the input disc of the friction coupling bears against a friction disc 90 that is glued or otherwise secured to an output disc 92 that is joined to the output shaft 64 for rotation therewith. A dish-shaped spring 96 urges the output disc and friction element into engagement with the input disc and bears against a retainer nut 98 threaded onto the rearward end of the output shaft 64. The friction coupling assembly is enclosed within the cavity against intrusion of lubricants and other foreign material that might affect its operation by a cover 100. The rear compartment 62b of the reduction device 60 is closed by a cover 102.

When the motor 54 is energized in either the forward or reverse direction (as described below) it drives the input shaft 58, thereby rotating the worm wheel by means of the worm gear 74 on the input shaft. Rotation of the worm wheel is transmitted directly to the input disc 80 which, in turn, imparts rotation to the friction disc and output disc of the friction coupling, thereby rotating the output shaft 64 and, therefore, the output gear 68. The output gear drives the racked wire 50 which, in turn, moves the guide member 32 along the track 30. The friction coupling 78 allows for slippage between the worm wheel and the output shaft and thereby limits the transmission of shock loads and high forces between the various components of the drive device. For example, if the guide member reaches the limit position while the motor is still energized and driving the drive device, the friction coupling will slip and prevent a shock load from being exerted on the drive motor 54 and will permit the motor to be overdriven without harming it or any other components of the drive system.

Figure 5:
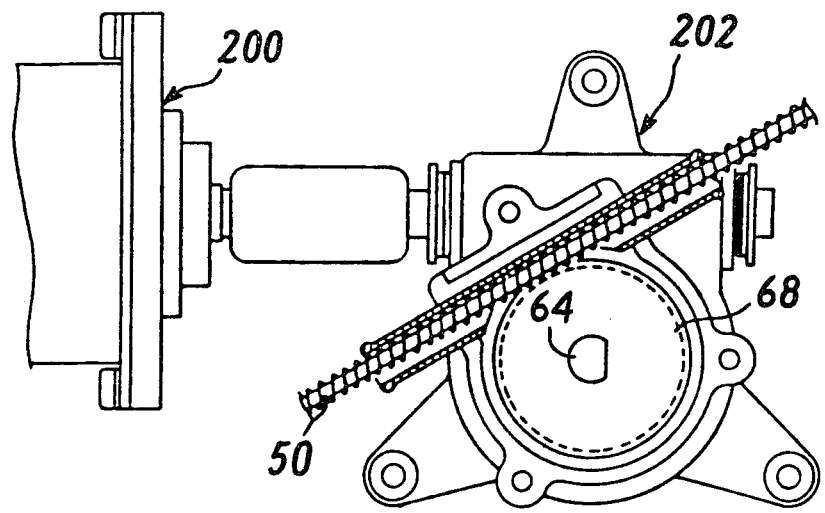
FIG. 5 is a side elevational view of a slightly modified embodiment of drive device similar to the one shown in FIGS. 2-4, in that it includes the restraint and release limit switches of a control system.
Figure 6:
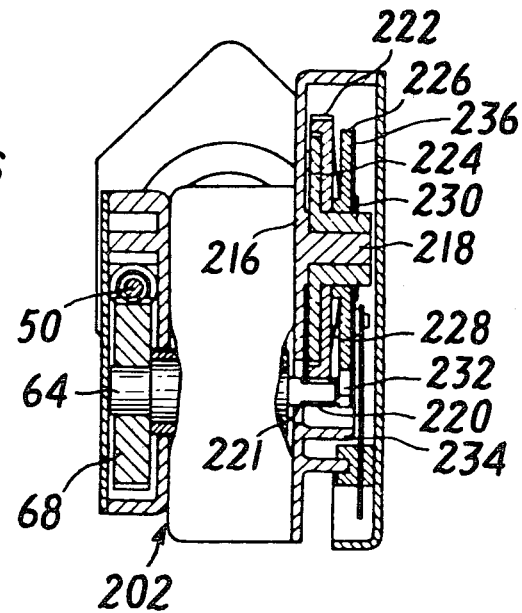
FIG. 6 is an end cross-sectional view of the drive device shown in FIG. 5.
Figure 7:
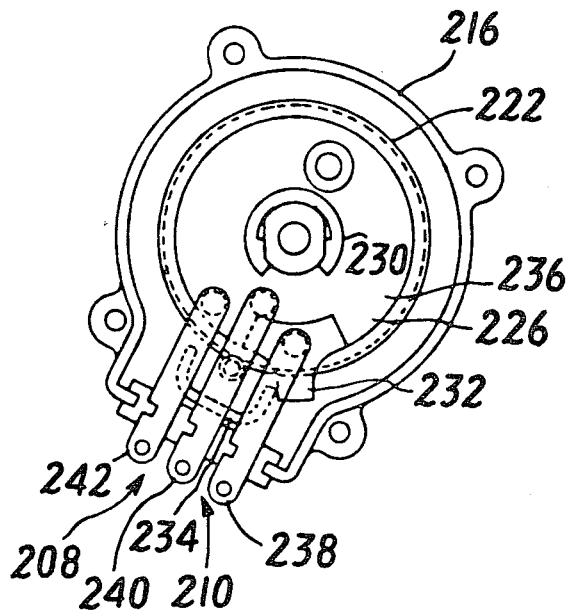
FIG. 7 is a rear elevational view of the device shown in FIGS. 5 and 6 with the rear cover removed to show the detector switch arrangement.
Figure 8:
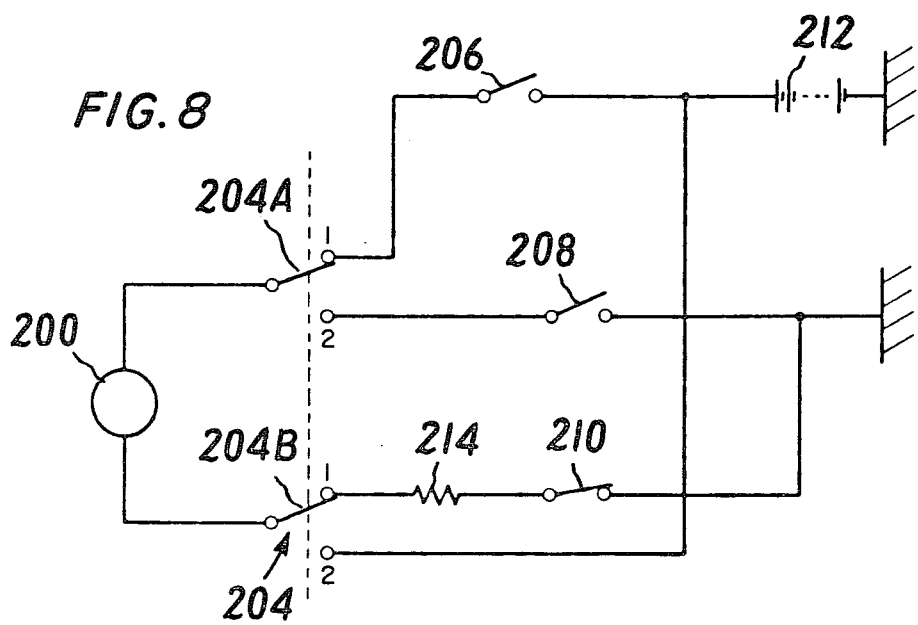
FIG. 8 is a schematic diagram of the electrical control circuit for the device shown in FIGS. 5 to 7.

The embodiment of the invention shown in FIGS. 5 to 7 is substantially the same as the embodiment shown in FIGS. 2 to 4 insofar as the drive motor 200 and the reduction device 202 are concerned. As a further advantageous feature of the invention, this embodiment includes the limit switch components of a control circuit for the transfer device. As shown in FIG. 8, the control circuit for the motor 200 includes a double-pole, double-throw door switch 204 that transfers between the two positions in response to opening and closing of the vehicle door. The circuit further includes a seat switch 206 that is open when the vehicle seat is unoccupied.

Figure 9:
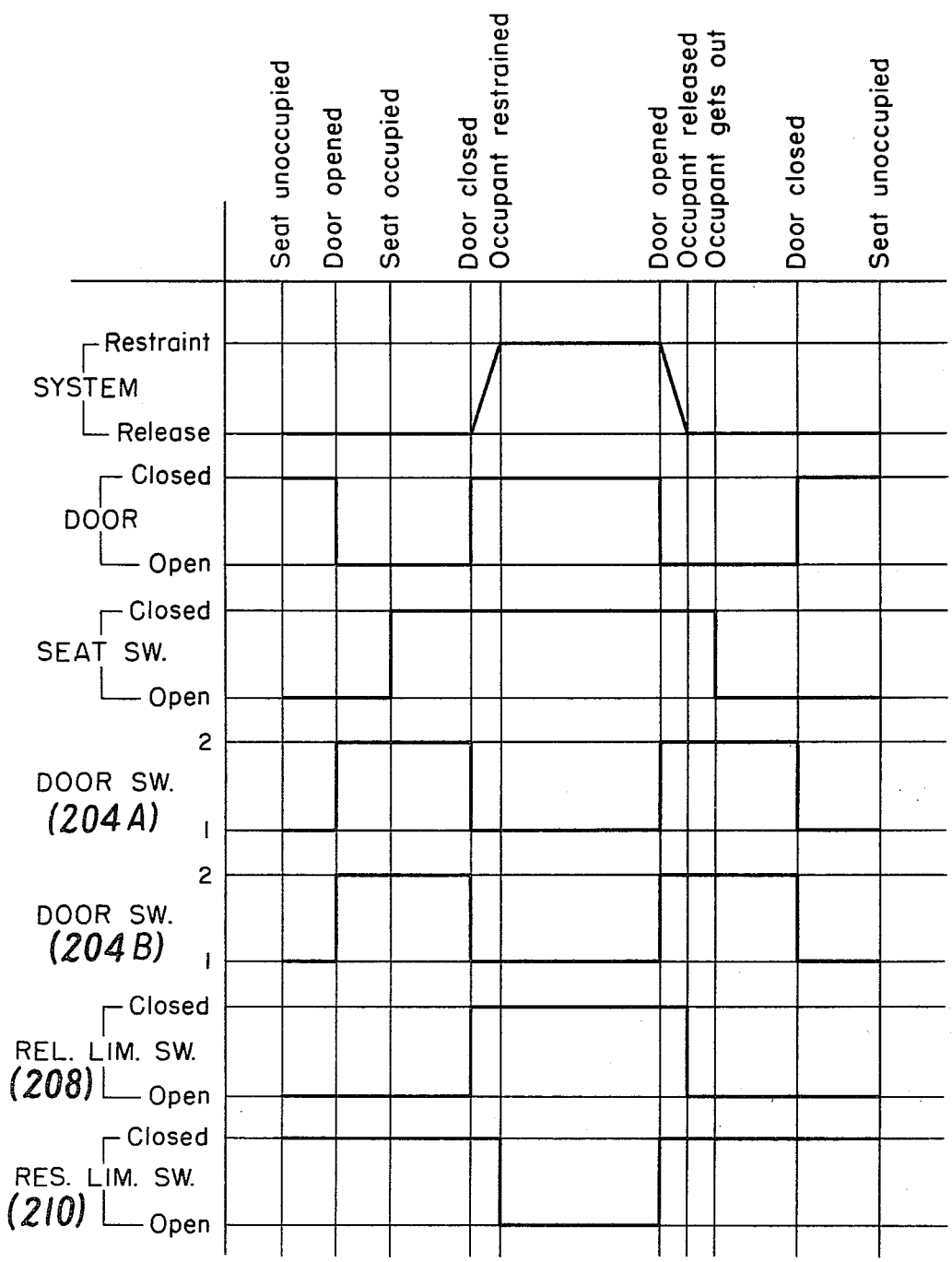
FIG. 9 is a timing diagram showing the sequence of operation of the control circuit and transfer device illustrated in FIGS. 5 to 8.

The control circuit of FIG. 8 comprises a first circuit for energizing the motor 200 to drive it in a direction for transferring the movable belt guide member from the release location at the upper front end of the guide rail to the restraint location at the lower rear end of the guide rail when the seat is occupied and the vehicle door is closed. The sequence of operations of the elements of the control circuit shown in FIG. 8 is diagrammed in FIG. 9. The condition of the circuit shown in FIG. 8 corresponds to the "seat unoccupied" stage of FIG. 9 in which the belt system is in the release configuration, the door is closed, the seat switch 206 open, and the movable contacts 204A and 204B are closed to stationary contacts 1. A release limit switch 208, a normally closed switch that indicates that the belt guide member is in the release position by opening, is open, and a restraint limit switch 210, a normally closed switch that indicates that the belt guide member is in the restraint position by opening, is closed. In this condition, neither the first circuit of the control nor a second circuit for energizing the motor 200 to drive it in a reverse direction for transferring the belt guide member from the restraint location to the release location is complete, and the motor is de-energized.

When the vehicle door is opened, the movable contacts 204A and 204B of the door switch transfer to stationary contacts 2, but the second circuit is not completed because the belt guide member is at the release location and the release limit switch 208 is, therefore, open. When the occupant sits down on the seat ("seat occupied"), the seat switch 206 closes, and when the occupant closes the door ("door closed"), the movable contacts of the door switch 204 transfer back to stationary contacts 1. This completes a circuit from the battery 212 across the closed seat switch 206, across the door switch 204 and across the restraint limit switch 210 to ground. Accordingly, the motor 200 is energized in a direction to transfer the belt guide member from the release location to the restraint location. The first circuit includes a resistance 214 which reduces the voltage across the motor 200 in order substantially to equalize the time required for the belt guide member to move from the restraint location to the release location with the time required to move it from the restraint location to the release location. In the former case, the retractors 28 and 38 contribute driving force to the movement of the belt guide member; in the latter case, the retractors require additional forces. When the guide member reaches the restraint location, the restraint limit switch transfers to open, thereby breaking the first circuit and stopping the motor 200. The occupant is now restrained by the belt system. Meanwhile, when the belt guide member left the release location, the release limit switch 208 transferred from open to closed.

When the occupant opens the door, the second circuit across the motor 200 is completed with reverse polarity by transfer of the door switch 204 to stationary contacts 2 and with the release location switch 208 closed. Accordingly, the motor is energized in the reverse direction and moves the belt guide member from the restraint location to the release location. When it reaches the release location, the release limit switch 208 transfers to open, breaks the second circuit, and stops the motor. The occupant is released from restraint by the belt and may leave the vehicle, thereby allowing the seat switch 206 to open. When the door closes, nothing happens because the first circuit is incomplete by reason of the open seat switch 206, even though the first circuit is partially completed across contacts 1 of the door switch 204. Meanwhile, the restraint limit switch 210 closed when the belt guide member left the restraint location. Accordingly, the system is now back to the configuration shown in FIG. 8.

The arrangement of limit switches shown in FIGS. 5 to 7 comprises a housing 216 suitably affixed to the back of the reduction device 202 and carrying a fixed gear shaft 218. A pinion 220 affixed to the end of the output shaft 64 of the reduction device extends into the housing 216 through a hole 221 in the housing base and meshes with a reduction gear 222 that is rotatably carried by a rotary disc 224 journaled on the shaft 218. A movable switch disc 226 is affixed to the disc 224 for rotation therewith. A dish-shaped spring 228 is compressed between the disc 226 and the gear 222. The switch disc, spring and gear are axially fixed on the rotary disc 224 by a C ring 230.

When the output shaft 64 is driven in either direction to drive the output gear 68 and thereby drive the transfer wire 50, the pinion 220 drives the reduction gear 222 and transmits rotation via the rotary disc 224 to the rotary switch disc 226. The switch disc 226 has a projecting lug 232 that engages a stop 234 in each of its limit positions of rotation (somewhat less than 360° apart). The rear face of the rotary switch disc has a conductive coating 236 that completes an electrical circuit across limit switch contacts 238, 240 and 242 that are affixed to the housing 216. Contact 240 corresponds to a common contact connected to ground for each of the limit switches 208 and 210 in the control circuit, and contacts 238 and 242 correspond to the positive connections of the switches 208 and 210. Both sets of switch contacts are closed by the rotary movable contact 226 except when the movable contact is near or at one or the other of the limit positions. Accordingly, the switch arrangement of FIGS. 5 to 7 provides the switching functions of the limit switches 208 and 210 of the motor control circuit.

The reduction gear 222 is frictionally coupled to the rotary disc 224 at the urging of the spring 228. Accordingly, if the stopping of the rotary switch disc 226 should not be properly timed to engagement of the stop 234, slippage will occur between the gear 222 and the disc 224. In practice, it is desirable to design the pinion 220 and the gear 222 to be overdriven in both directions to ensure that the respective switch contacts 238 and 242 open. The arrangement of friction couplings in the switch drive of FIGS. 5 to 7 and in the reduction device of a drive device, in accordance with the present invention, considerably facilitates ensuring that the restraint and release configurations of the belt are attained without precise timing of the drive and switch elements.

Figure 10:
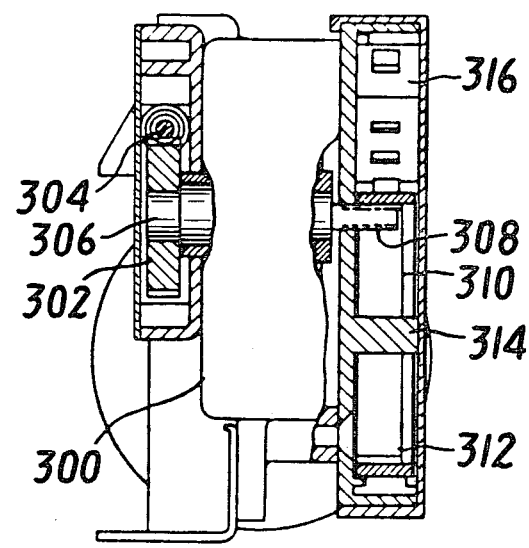
FIG. 10 is an end elevational view, with portions broken away in cross section, of another embodiment of a drive device in accordance with the present invention.
Figure 11:
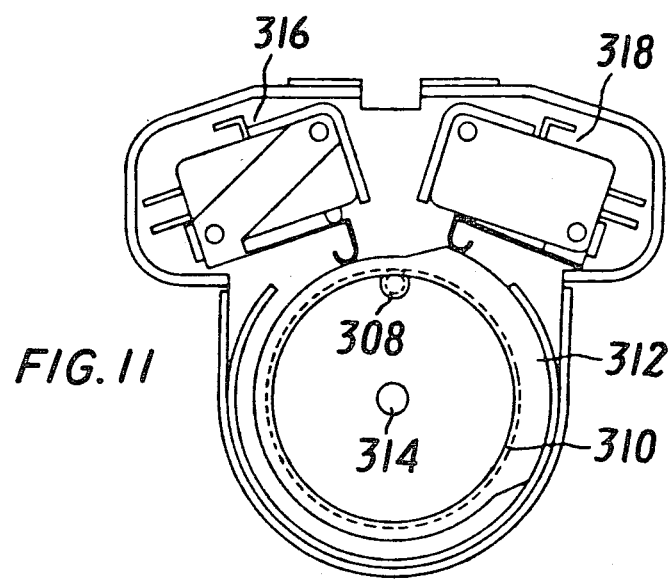
FIG. 11 is a rear elevational view of the drive device shown in FIG. 10 with the rear cover removed.

The embodiment of FIGS. 10 and 11 also incorporates limit switches with the motor and reduction device. It includes a reduction device 300 having an output gear 302 that drives a racked wire 304 and is carried by an output shaft 306. A pinion 308 meshes with internal teeth 310 on a rotary cam member 312 that is rotatably carried on a shaft 314. The cam member 312 opens and closes a release limit switch 316 and a restraint limit switch 318 in response to rotation with the output shaft 306. If desired, a suitable clutch can be interposed between the internal gear 310 and the cam 312, in the manner of the embodiment of FIGS. 5 to 7, with stops to limit the rotation of the cam member in both directions.

Thus, the foregoing embodiments of the invention provide the advantages of comparative simplicity, compact size, low weight, tolerance to dimensional differences between assembled vehicles (i.e., lack of need for precision manufacture and assembly) and other advantages without sacrificing reliability and long life. The preferred control circuit provides for system operation only in response to the occupation of the seat, so the system does not transfer to the restraint configuration when the seat is unoccupied, like some known systems do. The latter feature adds to the effective life of the system by eliminating unnecessary cycles. The compartmentalization of the casing enables permanent lubrication for long reliable life. The preferred forms, which include limit switches, greatly simplify installation, with consequent cost savings. The lack of long electric wire runs in the door reduces possible service problems—indeed, the unit is easy to service should there be trouble, because most components are included in a single unit. The system operates slowly in the release-restraint direction, thereby minimizing possible distress to an unwary passenger who might be surprised and upset by a fast system. Slow operation also saves wear and tear on the system by smooth operation and lower shock loads at stopping. The clutch in the drive train also reduces the effect of shock loads on the drive and makes precise timing of the switches and precision installation unnecessary.

The above-described embodiments are merely exemplary, and those skilled in the art will be readily able to make numerous variations and modifications of them without departing from the spirit and scope of the invention.

I claim:

1. In a passive vehicle occupant restraint belt system having a belt guide member that is coupled to a restraint belt and is movable between a restraint location in which the belt engages an occupant and a release location in which the belt releases the occupant, a reversible drive motor, control means for activating the motor to drive it in one direction in response to opening of the vehicle door and in the opposite direction in response to closing of the vehicle door, a semi-flexible drive element coupled to the guide member, and a reduction device for transmitting power from the motor to the drive element, the improvement wherein the reduction device comprises a housing having first and second closed compartments separated by a common dividing partition, an output shaft journaled in the partition and having a first portion located in the first compartment and a second portion located in the second compartment; an output drive element affixed to the first portion of the output shaft and coupled to the guide element to drive it; an input shaft having its axis disposed orthogonally to the axis of the output shaft and extending into the second compartment; a worm gear affixed on the input shaft; a worm wheel rotably carried on the second portion of the output shaft and meshing with the worm gear; and an enclosed friction coupling received within the second compartment and interposed between the worm wheel and the output shaft, the compartmentalization of the casing and enclosing of the friction coupling enabling the input and output gears to be lubricated while excluding lubricant from the friction coupling.

2. The improvement according to claim 1 wherein the worm wheel includes a hub portion supported on the output shaft and a peripheral flange on the hub having external teeth, thereby to defining a cavity within the flange, and wherein the friction coupling is received within the cavity, and further comprising a cap joined to the worm wheel flange to close the cavity.

3. The improvement according to claim 2 wherein the friction coupling includes an input disc coupled to the worm wheel for rotation therewith, an output disc coupled to the output shaft to drive it, a friction disc interposed between the input and output discs, and spring means for urging the input and output discs into engagement with the friction disc.

4. In a system according to claim 1 in which the drive motor is a reversible electric motor, the further improvement wherein the control means comprises a first electrical circuit adapted to connect the motor to a power source for rotation in one direction to drive the guide member from the release location to the restraint location, and including a seat switch adapted to be closed in response to a weight on the seat, a restraint location detector switch adapted to be closed when the guide member is not at the restraint location, and a control switch adapted to be closed in response to closing of the vehicle door, whereby the motor is driven in said one direction only when the seat is occupied, the belt guide member is away from the restraint location and the door is closed; and a second electrical circuit adapted to connect the motor to the power source for rotation in the other direction to drive the guide member from the restraint location to the release location and including a release location detection switch adapted to be closed when the belt guide member is away from the release location and a control switch adapted to be closed in response to opening of the vehicle door, whereby the motor is driven in said other direction only when the belt guide is away from the release location and the vehicle door is open.

5. The improvement according to claim 4 wherein the first circuit further includes an electrical resistance means for reducing the voltage across the motor when it is driven in said one direction, thereby tending to equalize the speeds at which the belt guide member is driven in both directions.

6. The improvement according to claim 4 or claim 5 wherein the detection switches are transferred in response to the rotational position of a switching member coupled to the output shaft of the reduction device by a reduction gear for rotation of less than 360° during rotation of the output shaft corresponding to full movement of the belt transfer guide member between the release and restraint locations.

7. The improvement according to claim 6 wherein each detector switch includes a pair of fixed contacts and the switching member includes a rotary conductive contact adapted to electrically connect the fixed contacts selectively.

8. The improvement according to claim 6 wherein the detector switches are microswitches and the switching member is a rotary cam having cam surfaces adapted to transfer the detector switches selectively.

* * * * *